United States Patent [19]

Georgopoulos

[11] Patent Number: 4,992,339

[45] Date of Patent: Feb. 12, 1991

[54] ELECTROCHEMICAL CELL WITH CIRCUIT DISCONNECT DEVICE

[75] Inventor: Philip Georgopoulos, Westlake, Ohio

[73] Assignee: Eveready Battery Company, Inc., St. Louis, Mo.

[21] Appl. No.: 493,169

[22] Filed: Mar. 14, 1990

[51] Int. Cl.[5] ............................................. H07M 2/26
[52] U.S. Cl. ......................................... 429/7; 429/62
[58] Field of Search ............................... 429/7, 61, 62

[56] References Cited

U.S. PATENT DOCUMENTS 4,788,112  11/1988  Kung ................................ 429/61 X
4,855,195  8/1989  Georgopoulos et al. ............. 429/54

FOREIGN PATENT DOCUMENTS 59-191273  10/1984  Japan .
59-203376  11/1984  Japan .
63-072062  4/1988  Japan .
63-175345  7/1988  Japan .

Primary Examiner—Stephen J. Kalafut
Attorney, Agent, or Firm—Robert W. Welsh

[57] ABSTRACT

The invention relates to an electrochemical cell employing a resettable safety disconnect device operable by a nonresettable shape memory alloy element. The shape memory alloy element is preferably in the form of a twisted wire that is restrained in the normal operation of the cell and expands when the internal temperature exceeds a preselected value whereupon the shape memory alloy wire will exert force on a moveable element in the electrical circuit of the cell to break contact in the electrical circuit thereby rendering the cell inoperative. This device could also include an opposing spring member to restore the shape memory alloy element to its original shape upon cooling and thus restore electrical contact.

20 Claims, 2 Drawing Sheets

ELECTROCHEMICAL CELL WITH CIRCUIT DISCONNECT DEVICE

FIELD OF THE INVENTION

The invention relates to an electrochemical cell employing a safety disconnect device operable by a shape memory alloy element.

BACKGROUND OF THE INVENTION

Under abuse conditions, high energy density electrochemical cells can leak or rupture which can cause damage to the device employing the cell or to people using the device. Examples of abuse conditions for a cell are abuse charging of the cell, forced discharging and external shorting. Such conditions cause the internal temperature of the cell to rise with a corresponding increase in pressure. Although such cells typically employ a venting mechanism wherein the electrolyte is expelled, the electrolyte can itself cause damage. Additionally, in cells which employ lithium as an anode material, if internal cell temperatures reach above 180° C., the lithium can melt and result in a fire. Therefore, safety devices other than venting means which will disconnect the electrical circuit under abuse conditions are desirable. If the circuit can be disconnected, the rise in the cell's internal temperature as a result of the abuse conditions can be terminated.

One method of interrupting the flow of electrical current in the cell when the internal temperature of the cell rises is to employ a PolySwitch disc, tradename of Raychem Corp., in the cell. Such a disc is a resettable device which, when a threshold temperature is reached, will inhibit the flow of electrical current in the cell. When the temperature is lowered, the disc will allow the normal available current in the electrical circuit to be restored. Unfortunately, these devices are not suitable for all applications. For example, when the PolySwitch disc is designed to function at low temperatures, the disc may have a low breakdown voltage. Once the breakdown voltage is reached, the disc no longer inhibits the current flow. Therefore, if cells containing these discs are used in a multicell device, and abuse conditions are experienced, the breakdown voltage would be reached and the PolySwitch disc would not inhibit the current flow.

In Japanese Patent Publication No. 59-191273, a memory alloy terminal lead is employed in a lithium/thionyl chloride cell. When the internal temperature of the cell rises, the alloy lead wire folds down to break the electrical circuit. When the temperature falls, the lead wire returns to its original shape, restoring the contact. Forming a resettable disconnect member of this single lead wire is undesirable, because the member must be trained to fold down and back again, which requires great expense and time.

In Japanese Patent Publication No. 59-203376 a memory alloy terminal wire is employed in a lithium/thionyl chloride cell to connect the negative or positive electrode to a terminal on the cell housing. The memory alloy terminal wire operates such that as the cell is overheated, the wire will deflect from contact with the terminal and then return to contact the terminal when the temperature within the cell is decreased. The drawbacks of using this type of memory alloy terminal wire are the same as discussed above for Japanese Patent Publication No. 59-191273.

In Japanese Patent 63-72062 a shape memory alloy is placed between a terminal plate and a sealing body of a cell so that the sealing body is broken, thereby venting the cell, when the temperature of the cell exceeds the transformation temperature of the shape memory alloy.

U.S. Pat. No. 4,855,195 discloses electrochemical cells that employ a current collector-safety switch member comprised of a shape memory alloy in the electric circuit in the cell. The collector-safety switch member has a base portion and a plurality of legs extended therefrom and when the internal temperature of the cell rises, the legs of the collector-safety switch member are retracted to thereby disconnect the electrical circuit in the cell. These cells can also be comprised of a resettable thermal switch for inhibiting the flow of current in the cell at a temperature below the disconnect temperature of the current collector-safety switch member.

It is an object of the present invention to provide a safety circuit disconnect device for use in electrochemical cells.

It is another object of the present invention to provide a safety circuit disconnect device that can operate reliably when a cell employing the device is subjected to abuse conditions.

It is another object of the present invention to provide a resettable circuit disconnect device that employs a shape memory alloy twisted wire that is easy to produce and cost effective to assemble in the cell.

The foregoing and additional objects will become fully apparent from the following description and the accompanying drawings.

DISCLOSURE OF THE INVENTION

The invention relates to an electrochemical cell comprising an electrode assembly containing at least one positive electrode and at least one negative electrode; a housing containing the electrode assembly and containing first means for providing a terminal on the housing for one of the electrodes; a cover for the housing and an insulating member for insulating the cover from the housing; second means within the housing for providing a terminal on the cover for the opposite electrode; one of said first and second means comprising a current collector assembly containing a movable member adapted for movement from a first position in which the current collector assembly is in electronic contact with one of the terminals to a second position in which the moveable member breaks the electronic contact between the current collector assembly and the terminal; and a shape memory alloy member disposed adjacent the moveable member and adapted to move the moveable member to the second position when the temperature within the cell exceeds a predetermined temperature thereby breaking the electronic contact between the current collector assembly and the terminal.

The shape memory alloy member used in this invention is an alloy material that can be formed into a desired shape at room temperature, and when heated, return to its original shape or a formed shape different from the first desired shape. The alloy need not itself be resettable. A resettable alloy is one that when exposed to heat will assume a different shape and upon cooling will return to its original shape without external force. A nonresettable alloy is one that when exposed to heat will assume a different shape but upon cooling will not return to its original shape without some opposing force or biasing means. The construction of the circuit disconnect device of this invention provides such a biasing means which opposes the force exerted by the shape memory alloy member. At temperatures below the transformation temperature of the shape memory alloy, the circuit remains unbroken because the force exerted by the shape memory alloy member is less than the opposing force. When the transformation temperature of the shape memory alloy is exceeded, the force exerted because of the shape change of the shape memory alloy member becomes greater than the opposing force and the electronic contact is broken by the movement resulting from the shape change in the shape memory alloy member. Upon cooling, the force exerted by the shape memory alloy member again becomes less than the opposing force, so that the shape memory alloy member is forced to return to its original shape, thereby restoring electronic contact. Thus the circuit disconnect device of this invention is resettable even when the shape memory alloy member itself is nonresettable.

Examples of alloys which exhibit shape memory characteristics are nickel-titanium alloys, copper-zinc-aluminum alloys, and aluminum-copper-silicon alloys. Most preferred for use in this invention are nonresettable nickel-titanium alloys.

The preferable shape memory alloy member for use in this invention would be in the shape of a twisted wire, such as a serpentine shape or coil shape configuration. In a twisted configuration at room temperature, the shape memory alloy wire would be smaller in length or height than the longitudinal length of the wire if it were extended in a straight length. Thus, if the twisted shape memory alloy wire were in a confined package or restrained in any manner and then if it were to extend when exposed to an elevated temperature, then the wire could exert a force against its restraining means. It is this force that the shape memory member exerts against a restraining member upon being exposed to a high temperature that is used to move a member in the current collector assembly to break the electronic contact with a terminal of a cell. Upon cooling, the shape memory alloy member exerts less force against the moveable member in the current collector assembly than does the opposing force or biasing means so that the latter causes the movable member to return to its original position, thereby forcing the shape memory alloy member to return to its original position, restoring the electronic contact between the current collector assembly and the terminal.

As stated above, the moveable member of the current collector assembly could be biased in a direction to allow the current collector assembly to contact the terminal of the cell while the shape memory alloy member would be positioned so that upon exposure to an elevated temperature, it would apply a force in the opposite direction to the moveable member to cause it to effectively break the electronic contact between the current collector assembly and the terminal of the cell. Preferably, the biasing means to apply force to the moveable member to enable the contact to be maintained can be a spring member such as a coiled spring or a spring disc having a plurality of extending legs that could exert a force on the moveable member. The extending legs may be formed by cutting slits in a portion of the base of a disc and then pushing the legs into an extended position. The extended legs could exert a force against the moveable member and when a greater opposite force is exerted against the moveable member, the legs will be forced to return toward the flush position which could effectively break the electronic contact between the current collector assembly and the terminal of the cell.

In another embodiment, the moveable member can be biased on one side by a conventional coiled spring and on the other side by a shape memory alloy coiled spring. Under normal temperature conditions, the conventional coiled spring would bias the moveable member into a position whereby the electronic contact is made between the current collector assembly and the cell's terminal. When the temperature exceeds a predetermined level, the shape memory alloy coiled spring would expand and exert a force against the moveable member causing it to effectively break the electronic contact between the current collector assembly and the cell's terminal. Upon cooling, the shape memory alloy coiled spring would contract under the higher force of the conventional coiled spring which would bias the moveable member back to its original position in which the current collector assembly would be in electronic contact with the cell's terminal.

The electrochemical cells of this invention employ a current collector assembly performing two functions. The first function is collecting the current from an electrode and transferring it to the terminal. The second is a safety function wherein the electrical contact between the electrode and terminal is broken when the internal temperature of the cell rises.

The current collector assembly preferably disconnects the electrical circuit at a temperature below the temperature at which the components of the cell melt or below the temperature at which the internal pressure of the cell becomes large enough to rupture the cell container. If a vent means is employed, the member preferably disconnects the electrical circuit below the venting temperature of the electrochemical cell. This temperature can vary according to cell systems. For cell systems which employ lithium as the anode, the current collector assembly preferably disconnects the electrical circuit below the temperature at which the lithium will melt. Most preferably, the disconnect temperature of the current collector assembly is between about 85° C. and about 95° C.

Any combination of positive and negative electrodes suitable to provide an electrical circuit in the cell can be used in the cells of this invention. Examples of suitable combinations are a stacked assembly, plate assembly, and spirally wound assembly.

The electrode assembly used in the cells of this invention is preferably a spirally wound electrode assembly. Typically, such an assembly has a negative electrode strip comprising an anode material and a positive electrode strip comprising a cathode material separated by a separator strip. Useful anode materials are consumable metals, such as aluminum, zinc, the alkali metals, alkaline earth metals, and alloys of alkali metals and alkaline earth metals. Preferred anode materials for nonaqueous electrolyte systems include aluminum, lithium, sodium, and calcium. Preferably, the anode material for such systems is lithium because it is ductile soft metal and possesses the highest energy-to-weight ratio of the group of suitable anode metals. Lithium can be utilized as a strip or can be applied to a suitable carrier. After being formed into the strip, the electrode will typically have an anode collector portion extending on one edge of the strip.

Suitable active cathode materials are electrochemically reducible materials. Such materials include natural or synthetic iron sulfides such as $FeS_2$ and FeS, manganese oxides such as $MnO_2$, carbon fluorides such as $(CF_x)_n$ or $(C_2F)_n$, $V_2O_5$, $WO_3$, $MoO_3$, $MoS_2$, lead oxides, cobalt oxides, copper oxides, copper sulfides, $In_2S_3$, NiS, $Ag_2CrO_4$, $Ag_3PO_4$, transition metal sulfides such as $TiS_2$, transition metal polysulfides, and mixtures thereof. By "active cathode" is meant the material being reduced in the electrochemical reaction. The active cathode material is formed into the positive electrode by mixing the active cathode material with an amount of a suitable conductive material such as carbon and an amount of a suitable binder. The mixture can then be formed into a strip material or pressed, impregnated or coated onto a suitable carrier such as foil or expanded metal. After being formed into the strip, the electrode will typically have a cathode collector portion extending on one edge of the strip.

Separator materials useful in this invention are materials which are electrically nonconductive but ionically conductive and are porous to allow the electrolyte to contact both electrodes. Examples of suitable separator materials are paper, polypropylene and polyethylene.

The spirally wound electrode assembly can be prepared by winding the separators, negative electrode, and positive electrode together so that the cathode collector protrudes from one end of the assembly while the anode collector extends from the other end of the assembly.

Suitable electrolytes for use in the cells of this invention can be aqueous or nonaqueous. Nonaqueous electrolytes can employ organic or inorganic solvents containing a conductive solute. Suitable solvents include tetrahydrofuran (THF), dioxolane, dimethoxyethane (DME), dimethyl isoxazole (DMI), 3-methyl-2-oxazolidone, diethyl carbonate (DEC), propylene carbonate, ethylene glycol sulfite (EGS), dioxane, dimethyl sulfite (DMS), or the like and mixtures thereof.

Suitable salts include: $MCF_3SO_3$, MSCN, $MBF_4$, $MClO_4$ and $MM'F_6$ wherein M is lithium, sodium or potassium, and M' is phosphorus, arsenic or antimony. The particular salt selected is compatible and non-reactive with the solvent and the electrodes of the cell. The amount of salt to be added to the solvent should be sufficient to provide an ionically conductive solution with a conductivity of at least about $10^{-4} ohm^{-1} cm^{-1}$. Typically, about 0.5 M of the salt will be sufficient. An example of a preferred electrolyte is a mixture of dioxolane, propylene carbonate, and dimethoxyethane, and $LiClO_4$.

The housing of the cells of this invention is comprised of an electrically conductive material such as metal. It contains a means for providing a terminal for one of the electrodes. Preferably, the housing has an open end and a closed end and is cylindrical. The housing itself can contact one of the electrodes to provide a terminal.

The cover assembly also contains a means for providing the terminal opposite in polarity from the terminal provided by the housing. Preferably, the cover assembly further comprises a means for sealing and insulating the cover assembly from the cell housing, and a seal-vent assembly including a means for venting the cell.

Examples of suitable venting means in the seal-vent assembly include providing an orifice in the assembly to provide a path from the interior of the cell to the exterior of the cell. This orifice can then be closed with a sealing plug which will melt at a temperature or will be expelled at a pressure suitable to allow the internal components of the cell to escape. Another suitable venting means is coining or etching a design in the assembly to provide weakened areas which could be blown out under increased cell pressure. A preferred vent means has a seal-vent assembly having a venting well providing a means for venting the cell. Such a means is preferably provided by employing a vent orifice in the bottom of the venting well and inserting a vent sealing member in the venting well over the orifice. Such a desirable vent means is disclosed in U.S. Pat. Appl. Ser. No. 102,814 which is incorporated herein in its entirety as if fully recited.

In a preferred embodiment the cells are assembled by forming the electrode assembly and inserting the assembly into a housing having a closed end and an open end, so that one of the electrodes is in contact with the housing. After placing the electrode assembly in the cell, the electrolyte is added and the cover assembly is placed over the open end of the housing.

The present invention will become more apparent from the following description thereof when considered together with the accompanying drawing which is set forth as being exemplary of embodiments of the present invention and is not intended in any way to be limitative thereof.

Description of the Preferred Embodiments

Figure 1:
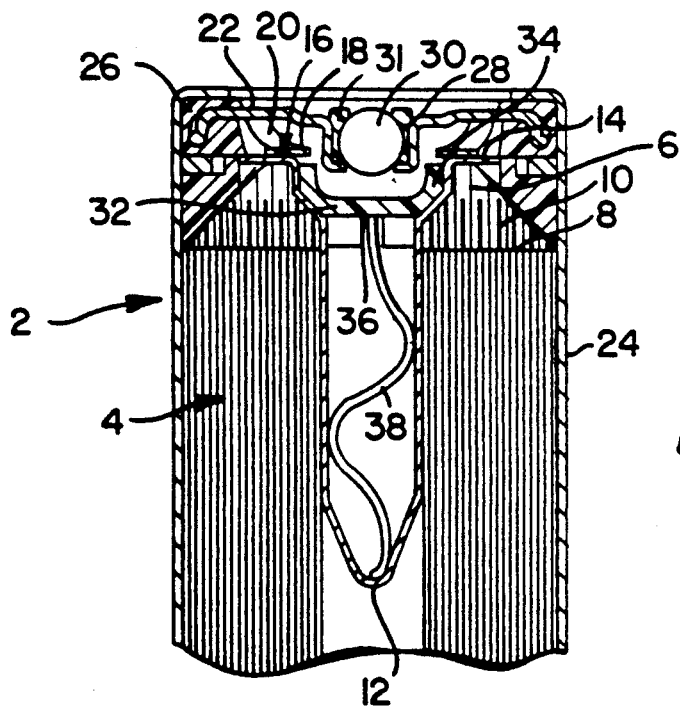
FIG. 1 is a vertical cross-sectional view of the upper portion of an electrochemical cell made in accordance with the present invention and employing a shape memory alloy in a serpentine configuration.
Figure 2:
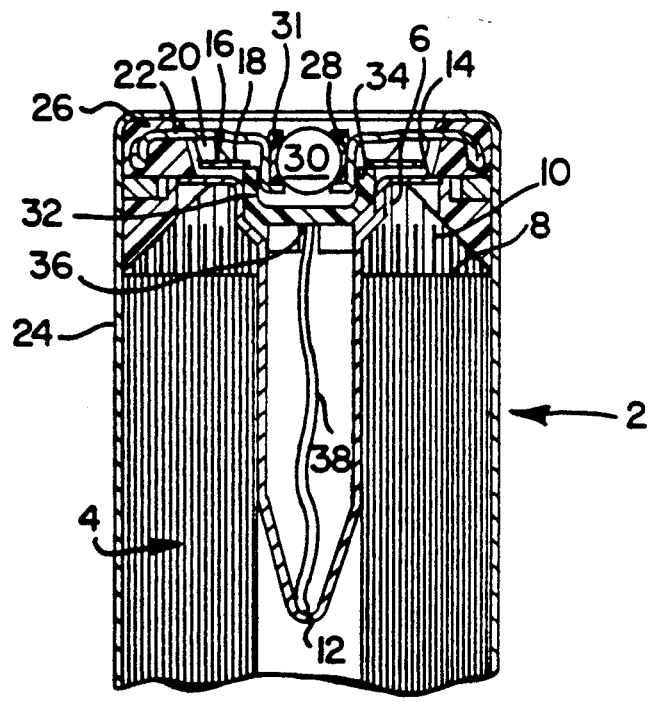
FIG. 2 is a vertical cross-sectional view of the cell in FIG. 1 after the cell is exposed to an excessive internal temperature rise.

Referring to FIG. 1, an electrochemical cell 2 is shown having a spirally wound electrode assembly 4 prepared by superimposing and overlapping a first electrode strip 6 onto a second electrode strip 8 with an insulating separator 10 extending between the edges of electrode strip 6 and electrode strip 8. The edges of electrode strip 6 extend at the top end of the cell 2 to contact inner disposed conductive container 12 at its extended flange 14. Disposed on top of flange 14 is a conductive member 16 preferably made of a spring material, having a base portion 18 in contact with flange 14 and having upwardly extending legs 20 contacting a conductive cover 22. Conductive cover 22 is sealed to the cell's container 24 and insulated from container 24 by gasket 26. The cover 22 has a well 28 to accommodate a seal-vent member 30. A lining 31 is disposed between well 28 and seal-vent member 30. In this arrangement, the edges of electrode strip 6 are in electronic contact with cover 22 via conductive container 12 and conductive spring member 16 so that the cover 22 is adapted as a terminal for the cell. Although not shown, electrode strip 8 extends at the bottom of the cell and electronically contacts the cell's container 24 thereby adapted the container 24 as the terminal for electrode strip 8. Disposed at the mouth or opening of inner conductive container 12 is an insulating movable member 32 having an upstanding peripheral extension 34 that is disposed below and spaced apart from conductive spring member 16. Attached to the underside 36 of movable member 32 is a shape memory alloy wire 38 that was formed into a serpentine configuration. This shape memory alloy wire will elongate when exposed to a preselected temperature, e.g. above 90° C., and since it is restrained at one end within container 12, it will extend against and force movable member 32 upward. Movable member 32 in turn will contact spring member 16 and force it upward to break electrical contact between spring member 16 and container 12 thereby breaking the electronic contact to the cover 22. FIG. 2 shows the electrochemical cell of FIG. 1 and has the same components identified with the same reference numbers. FIG. 2 shows the cell after the internal temperature rise exceeds a predetermined level so that the shape memory alloy wire 38 extends and results in the electronic contact between spring member 16 and flange 14 of container 12 being broken. Upon cooling, spring member 16 serves as the opposing force to cause the shape memory alloy wire 38 to return to its serpentine configuration and force movable member 32 away from spring member 16. Spring member 16 will then be returned to contact flange 14 of conductive container 12 thereby electronically connecting electrode strip 6 to cover 22 again. As stated earlier, the shape memory alloy can be nonresettable so that once it is extended, it will remain extended thereby preventing the reconnection of electrode strip 6 to cover 22. Generally when a shape memory alloy wire is exposed to a temperature below its transformation temperature, the wire material is transformed to a material of less strength. At this temperature, the force exerted by the spring contact member 16 is greater than that of shape memory alloy member 38, forcing the movable member 32 downward and re-establishing electronic contact between spring member 16 and flange 14 of container 12.

Figure 3:
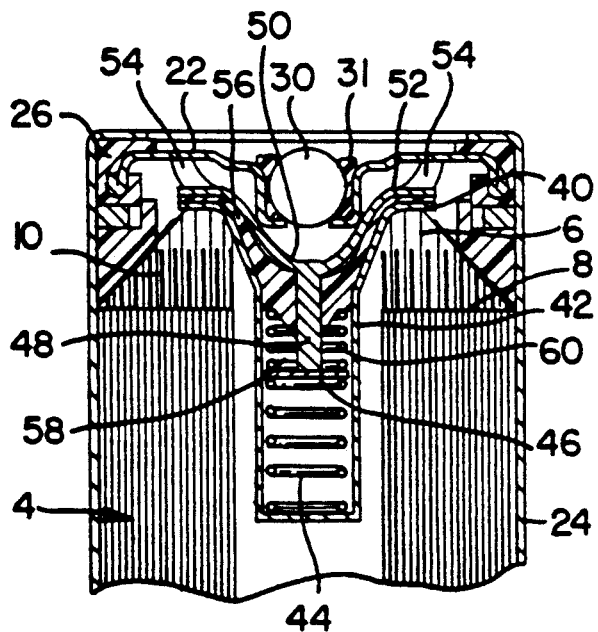
FIG. 3 is a vertical cross-sectional view of the upper portion of another embodiment of an electrochemical cell made in accordance with the present invention and employing a shape memory alloy having a coiled spring configuration.

FIG. 3 shows an electrochemical cell employing some similar components as the cell in FIG. 1 and such components have been identified with the same reference numbers. In FIG. 3 the edges of electrode strip 6 contact flange 40 of an inner conductive container 42. Container 42 has disposed at its bottom a conventional type conductive coiled spring 44 which exerts a force against a conductive member 46 (e.g. a disc) which in turn exerts force against a conductive pin 48. Pin 48 has an inclined extended segment 50 terminating with an extended flange 52. The extended flange 52 has a plurality of upward spring legs 54 formed from the base material and said legs 54 contact and exert force against cover 22. (A separate spring member having legs 54 could also be used, if desired.) In the arrangement shown in FIG. 3, electrode strip 6 is in electronic contact with cover 22 via conductive container 42, conductive coiled spring 44, conductive member 46 and conductive pin 48. Disposed between conductive pin 48 and the inner surface of container 42 is an insulating gasket 56 which electrically insulates pin 48 from direct contact with container 42. Gasket 56 extends partially within container 42 and provides an annular cavity 58 between the lower segment of pin 48 and the inner wall of container 42. A shape memory alloy coiled spring 60 is disposed in cavity 58 and exerts pressure against the bottom surface of gasket 56 and the top surface of conductive member 46. At room temperature, the opposing force provided by coiled spring 44 is sufficient to maintain contact between conductive member 46 and conductive pin 48.

Figure 4:
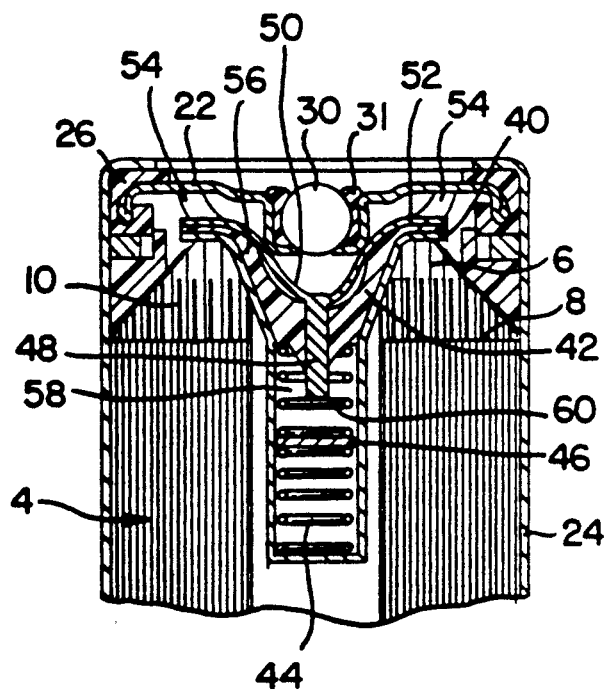
FIG. 4 is a vertical cross-sectional view of the cell in FIG. 3 after the cell is exposed to an excessive internal temperature rise.

FIG. 4 shows the electrochemical cell of FIG. 3 and has the same components identified with the same reference numbers. In FIG. 4, the cell is shown after the internal temperature has exceeded a predetermined value. In this condition, shape memory alloy spring 60 exerts a greater downward force due to its extension as a result of the increase in internal temperature. Since its downward force is greater than that of opposing spring 44, conductive member 46 is forced downward to break electrical contact with conductive pin 48. This breaks the electrical contact to cover 22 thereby making the cell inoperable. Upon cooling, the shape memory alloy spring 60 will retract under the greater spring force exerted by opposing spring 44 against conductive member 46, bringing member 46 back into electrical contact with conductive pin 48.

The embodiments shown in FIGS. 1 through 4 illustrate examples of a resettable disconnect device for electrochemical cells in accordance with this invention. The device of this invention will preferably interrupt the cell's circuit prior to venting of the cell or rupture of the cell's housing.

It is to be understood that although the present invention has been described with reference to many particular details thereof, it is not intended that these details shall be construed as limiting the scope of this invention.

What is claimed:

1. An electrochemical cell comprising an electrode assembly containing at least one positive electrode and at least one negative electrode; a housing containing the electrode assembly and containing first means for providing a terminal on the housing for one of the said positive and negative electrodes; a cover for the housing and an insulating member for insulating the cover from the housing; second means within the housing for providing a terminal on the cover for the opposite electrode; one of said first and second means comprising a current collector assembly containing a movable member adapted for movement from a first position in which the current collector assembly is in electronic contact with one of the terminals to a second position in which the moveable member breaks the electronic contact between the current collector assembly and the terminal; and a shape memory alloy member disposed adjacent the moveable member and adapted to move the moveable member to the second position when the temperature within the cell exceeds a predetermined temperature thereby breaking the electronic contact between the current collector assembly and the terminal.

2. The electrochemical cell of claim 1 wherein the shape memory alloy member is a wire.

3. The electrochemical cell of claim 2 wherein the shape memory alloy wire has a serpentine configuration.

4. The electrochemical cell of claim 2 wherein the shape memory alloy wire has a coiled configuration.

5. The electrochemical cell of claim 1 wherein the current collector assembly comprises a container disposed within the housing and having an outwardly extending upper flange defining an open end and said container being in electrical contact with one of the electrodes; conductive spring member having a base in electrical contact with the flange of the container and said base having a plurality of legs extending from the base portion to electrically contact the cover; a moveable member seated at the open end of the container and having an upstanding wall facing and contacting the base of the conductive spring member; a shape memory alloy wire in a twisted configuration restrained within the container below the movable member and having one end secured to the bottom of the movable member; and wherein the shape memory alloy wire will elongate when exposed to a temperature above a preselected value whereupon the wire will push against the movable member and force the movable member to contact and move the conductive spring member away from the container thereby breaking electrical contact between the cover and the container.

6. The electrochemical cell of claim 5 wherein the shape memory alloy wire is a non-resettable alloy.

7. The electrochemical cell of claim 5 wherein the electrode assembly is a coiled electrode assembly.

8. The electrochemical cell of claim 1 wherein the current collector assembly comprises a container having an outwardly extending flange defining an opening in the container, said extending flange electrically contacting one of the electrodes; a conductive coiled spring disposed within the container; a moveable conductive member disposed on top of the conductive coiled spring; a conductive pin member positioned within the open end of the container and extending to contact the top surface of the conductive member, said pin member having an outwardly extending flange containing a plurality of extending legs that electrically contact the cover; an insulating member disposed between the pin and the container to electrically insulate the container from the pin; a shape memory alloy coiled spring disposed within the container between and in contact with the lower surface of the insulating member and the upper surface of the moveable conductive member and wherein the force of said conductive coiled spring is sufficient to force the moveable conductive member in electrical contact with the conductive pin; and wherein the shape memory alloy coiled spring when exposed to a temperature above a preselected value will expand and force the moveable conductive member to break electrical contact with the conductive pin thereby breaking electrical contact between the cover and the container.

9. The electrochemical cell of claim 8 wherein the shape memory alloy coiled spring is a nonresettable alloy.

10. The electrochemical cell of claim 1 wherein the electrode assembly is a coiled electrode assembly.

11. The electrochemical cell of claim 10 wherein the shape memory alloy member is a wire.

12. The electrochemical cell of claim 11 wherein the shape memory alloy wire has a serpentine configuration.

13. The electrochemical cell of claim 11 wherein the shape memory alloy wire has a coiled configuration.

14. The electrochemical cell of claim 1 wherein one electrode comprises lithium and the other electrode comprises iron sulfide.

15. The electrochemical cell of claim 1 wherein one electrode comprises lithium and the other electrode comprises a member of the group consisting of $MnO_2$, carbon fluoride and mixtures thereof.

16. The electrochemical cell of claim 1 wherein the shape memory alloy is selected from the group consisting of nickel-titanium alloys, copper-zinc-aluminum alloys, and aluminum-copper-silicon alloys.

17. The electrochemical cell of claim 16 wherein the shape memory alloy is a nonresettable nickel-titanium alloy.

18. The electrochemical cell of claim 17 wherein the shape memory alloy member is a wire.

19. The electrochemical cell of claim 17 wherein one electrode comprises lithium and the other electrode comprises iron sulfide.

20. The electrochemical cell of claim 17 wherein one electrode comprises lithium and the other electrode comprises a member of the group consisting of $MnO_2$, carbon fluoride and mixtures thereof.

* * * * *